(12) United States Patent
Nishino et al.

(10) Patent No.: US 7,949,632 B2
(45) Date of Patent: May 24, 2011

(54) DATABASE-REARRANGING PROGRAM, DATABASE-REARRANGING METHOD, AND DATABASE-REARRANGING APPARATUS

(75) Inventors: Mitsuhide Nishino, Kawasaki (JP); Hisayuki Enbutsu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 662 days.

(21) Appl. No.: 10/990,270

(22) Filed: Nov. 16, 2004

(65) Prior Publication Data

US 2005/0246385 A1 Nov. 3, 2005

(30) Foreign Application Priority Data

Apr. 28, 2004 (JP) ................... 2004-132350

(51) Int. Cl.
*G06F 7/00* (2006.01)
*G06F 17/00* (2006.01)
(52) U.S. Cl. .................. 707/615; 707/635; 707/703
(58) Field of Classification Search .................. None
See application file for complete search history.

(56) References Cited

U.S. PATENT DOCUMENTS

| | | | | |
|---|---|---|---|---|
| 5,193,162 | A * | 3/1993 | Bordsen et al. ............. | 711/152 |
| 5,561,778 | A * | 10/1996 | Fecteau et al. .............. | 711/209 |
| 6,023,707 | A * | 2/2000 | Hamada et al. ............. | 707/202 |
| 6,108,671 | A * | 8/2000 | Ogawa ........................ | 707/204 |
| 6,161,109 | A * | 12/2000 | Matamoros et al. ......... | 707/203 |
| 6,289,357 | B1 * | 9/2001 | Parker ......................... | 707/610 |
| 6,377,959 | B1 | 4/2002 | Carlson ....................... | 707/202 |
| 6,421,678 | B2 * | 7/2002 | Smiga et al. ................ | 707/608 |
| 6,636,876 | B1 | 10/2003 | Ishihara et al. | |
| 6,643,640 | B1 * | 11/2003 | Getchius et al. ............ | 707/719 |
| 6,671,680 | B1 * | 12/2003 | Iwamoto et al. ............ | 707/737 |
| 6,782,387 | B1 * | 8/2004 | Kumashio .................... | 707/608 |
| 6,801,921 | B2 * | 10/2004 | Tsuchida et al. ............. | 1/1 |
| 7,096,227 | B2 * | 8/2006 | Murray et al. ............... | 1/1 |
| 2006/0143238 | A1 | 6/2006 | Tamatsu ....................... | 707/200 |

FOREIGN PATENT DOCUMENTS

| | | |
|---|---|---|
| JP | 05-151037 | 6/1993 |
| JP | 5-151037 | 6/1993 |
| JP | 6-067950 | 3/1994 |
| JP | 07-262068 | 10/1995 |
| JP | 9-034758 | 2/1997 |
| JP | 10-207754 | 8/1998 |
| JP | 10-333946 | 12/1998 |
| JP | 11-102311 | 4/1999 |
| WO | WO 2004/025475 | 3/2004 |

* cited by examiner

*Primary Examiner* — Charles Rones
*Assistant Examiner* — Daniel Kuddus
(74) *Attorney, Agent, or Firm* — Greer, Burns & Crain, Ltd.

(57) ABSTRACT

A database-rearranging program which is capable of rearranging a database while maintaining high reliability, without stopping services provided by the database. When a request for rearranging the copy source database is input, a record copying module sequentially selects pages in the copy source database, and the records in the selected page are copied to the copy destination database. Further, the record copying module sets a progress of copying of each page of the copy source database to a page status management table. Thereafter, when a request for writing updated records is input, a record writing module refers to the page status management table, and when a page of the copy source database in which the updated records should be written is in an uncopied status, the updated records are written in the page of the copy source database, and when the same is in a copied status, the updated records are written in the copy source database and the copy destination database.

7 Claims, 11 Drawing Sheets

DATABASE-REARRANGING PROGRAM, DATABASE-REARRANGING METHOD, AND DATABASE-REARRANGING APPARATUS

CROSS-REFERENCE TO RELATED APPLICATIONS

This application is based upon and claims priority of Japanese Patent Application No. 2004-132350, filed on Apr. 28, 2004, the contents of which are incorporated herein by reference.

BACKGROUND OF THE INVENTION

1. Field of the Invention

The present invention relates to a database-rearranging program, a database-rearranging method, and a database-rearranging apparatus, and more particularly to a database-rearranging program, a database-rearranging method, and a database-rearranging apparatus, which perform rearrangement of a database while continuing transactions on the database.

2. Description of the Related Art

In lots of database systems, it is necessary to rearrange a database so as to maintain an efficient data input and output environment. For example, the rearrangement is carried out for the following purposes:

Integration of free areas existing between records in pages (resolving fragmentation)

Enhancement of access performance, by moving records in overflow pages into prime pages Expansion of the data storage area of the database before it is filled with records In a conventional general rearranging process, first, all the records in the database are saved in an intermediate file. Then, after executing the expansion of the capacity of the database or like processing, the saved data is restored in the database.

FIG. 10 is a diagram illustrating a conventional general database-rearranging method. In FIG. 10, there is shown an example of the case where the data of a database 911 are rearranged and stored in a database 921.

The database 911 has a prime pages storage area 911a for storing a plurality of prime pages, and an overflow pages storage area 911b for storing a plurality of overflow pages. The prime pages are basic storage areas for storing records. Prime pages where records should be stored are defined in advance by an index 912.

The overflow pages are storage areas for storing records which cannot be stored in prime pages associated therewith due to shortage of available space of the prime pages. When records are stored in an overflow page, a pointer is set in a prime page where the records should have been stored, which points to the overflow page where the records are actually stored.

When rearranging the database 911, first, the records in the database 911 are saved in a storage medium 930, such as a magnetic tape (step S101). The saving of data is carried out in the increasing order of page numbers, starting with the first page of the prime pages, according to the index information. When there are overflow pages which are pointed to by respective pointers in the associated prime pages, after records in one prime page are saved, records in the associated overflow page are saved, sequentially. This saving process is repeatedly carried out to the last page.

Next, an index 922 is prepared again, and the database 921 expanded in capacity is constructed (step S102). In the prepared index 922, pages for storing records are defined such that all the records are stored in the prime pages storage area 921a. The database 911 in the storage device is once erased, and subsequently, the database 921 expanded in capacity is reconstructed. Then, the records saved in the recording medium 930 are restored in the database 921 (step S103).

Thus, the database can be rearranged. By executing storage of records into the database 921 according to the designation of the index 922 newly prepared, more prime pages, for example, become available, which enhances the access performance of the database 921. Further, when records are stored thereafter, overflow pages are not formed additionally, since certain amounts of space have been produced in the prime pages, which makes it possible to prevent degradation of the access performance.

However, this database-rearranging method necessitates stoppage of processing, such as updating of the database 911, during a time period between saving of the records and restoration of the same. This is because the data cannot be guaranteed if records are stored during rearrangement of the database. This makes it impossible to apply this method to systems which are required to operate on a 24-hour basis. Therefore, a method is necessitated which enables execution of the database rearrangement during operation of processing functions involving access to the database.

FIG. 11 is a diagram illustrating a method for executing the database rearrangement without stopping access to the database. In this method, separately from a database 941 (copy source) which is accessed by a processing function using the database, a database 951 (copy destination) for execution of the rearrangement is newly provided in advance. The databases 941 and 951 are provided with respective associated indexes 942 and 952. Further, the database 941 has a prime pages storage area 941a for storing a plurality of prime pages, and an overflow pages storage area 941b for storing a plurality of overflow pages. Similarly, the database 951 has a prime pages storage area 951a for storing a plurality of prime pages, and an overflow pages storage area 951b for storing a plurality of overflow pages. In the illustrated example, it is assumed that the database 951 has a larger storage capacity than the database 941.

The records stored in the pages of the database 941 as the copy source are sequentially copied to the database 951 as the copy destination, starting with the first page thereof, thereby executing the rearrangement of the database (step S111).

At this time, a transaction 961 can be received which intends to update records stored in the database 941 as the copy source. For example, a record (record number "R1") in a prime page is altered by the transaction 961, and a record (record number "R33") is added to an overflow page (step S112). When the processing for updating the records is executed during the rearrangement, the contents of the updating processing are recorded in an after-update log 943 (step S113).

Here, assuming that an application program updates records thus copied, the after-update log 943 concerning the copied records is added in to the records in the database 951 as the copy destination (step S114). The term "add in" is intended to mean processing in which the contents of the updated records are reflected in the database 951. By executing the add-in processing, the old records are overwritten by the updated records whereby the matching between the data in the copy source and the data in the copy destination is guaranteed. This type of method of updating the database is called "DB snapper" (see e.g. Japanese Unexamined Patent Publication (Kokai) No. 2000-339210).

In the method shown in FIG. 11, until the after-update log 943 is added in, the latest property of the data cannot be guaranteed. Therefore, the transaction 962 involving the access to the rearranged database 951 is rejected even if it is for referring to the database 951 (step S115). In the example shown in FIG. 11, during the add-in processing, a transaction 962 is carried out which involves referring to a record having a record number "R11". At this time, the copying of the record to the database 951 as the copy destination is not completed yet, the instant reference cannot be carried out (due to time lag). When the add-in processing of the after-update log 943 to the database 951 as the copy destination is completed, the reference to the record is permitted thereafter.

It is also possible to duplicate data in units of blocks, and perform management by checking whether or not the rearrangement is completed on a block-by-block basis, and in this case, an access to a block of which the rearrangement is completed is performed on the database as the copy destination. On the other hand, an access to a block of which the rearrangement is not completed is performed on the database as the copy source. Further, an access to a block being copied is performed on the database as the copy destination after completion of copying (see e.g. Japanese Unexamined Paten Publication (Kokai) No. H05-151037).

However, in the method shown in FIG. 10, during the execution of add-in of the log, the access to the database is inhibited. More specifically, after a record is updated and until the log of the update is reflected, the latest property of the copied record cannot be guaranteed. Therefore, an application program cannot instantly use the record.

According to the method described in Japanese Unexamined Patent Publication (Kokai) No. H05-151037, the rearrangement of the database can be carried out without stopping the access to records. However, when a malfunction or the like occurs in the system, destroying contents of the database, it is difficult for this method to correctly restore the database. That is, according to this method, when contents of a copied block are updated, the records of the block are written into the database as the copy destination alone. Therefore, the updating process of only the destination database is recorded in the after-update log.

At this time, if a malfunction occurs in the database as the copy source during the processing of the rearrangement, the contents of the database as the copy source are restored to the state backed up in the past. Even if the contents of the after-update log storing contents of update made on the database as the copy source are reflected in the database in this state, the contents of the updating processing carried out on the destination database are not reflected. This makes it difficult to guarantee the records written in the destination database. Therefore, this method cannot be applied to systems of which high reliability is demanded, such as a system for managing bank accounts.

SUMMARY OF THE INVENTION

The present invention has been made in view of these points, and an object thereof is to provide a database-rearranging program, a database-rearranging method, and a database-rearranging apparatus, and more particularly to a database-rearranging program, a database-rearranging method, and a database-rearranging apparatus, which are capable of rearranging a database while maintaining high reliability, without stopping services provided by the database.

To attain the above object, in a first aspect of the present invention, there is provided a database-rearranging program for causing a computer to carry out a process for rearranging a database in which records to be stored are defined for each of a plurality of pages. The database-rearranging program is characterized in that the computer is caused to function as record copying means responsive to a request for rearranging a copy source database, for sequentially selecting pages of the copy source database, copying records in a selected one of the pages to a copy destination database, and setting a status of progress of copying of each page of the copy source database to a page status management table, and record writing means responsive to a request for writing an updated record, for referring to the page status management table, and writing the updated record in a corresponding one of the pages of the copy source database if the page of the copy source database in which the updated record should be written is in an uncopied status, and writing the updated record in the copy source database and the copy destination database if the page in which the updated data should be written is in a copied status.

To attain the above object, in a second aspect of the present invention, there is provided a method of rearranging a database in which records to be stored are defined for each of a plurality of pages. The database-rearranging method is characterized by comprising a record copying step of, in response to a request for rearranging a copy source database, sequentially selecting pages of the copy source database, copying records in a selected one of the pages to a copy destination database, and setting a status of progress of copying of each page of the copy source database to a page status management table, and a record writing step of, in response to a request for writing an updated record, referring to the page status management table, and writing the updated record in a corresponding one of the pages of the copy source database if the page of the copy source database in which the updated record should be written is in an uncopied status, and writing the updated record in the copy source database and the copy destination database if the page in which the updated data should be written is in a copied status.

To attain the above object, in a third aspect of the present invention, there is provided a database-rearranging apparatus for rearranging a database in which records to be stored are defined for each of a plurality of pages. The database-rearranging apparatus is characterized by comprising record copying means responsive to a request for rearranging a copy source database, for sequentially selecting pages of the copy source database, copying records in a selected one of the pages to a copy destination database, and setting a status of progress of copying of each page of the copy source database to a page status management table, and record writing means responsive to a request for writing an updated record, for referring to the page status management table, and writing the updated record in a corresponding one of the pages of the copy source database if the page of the copy source database in which the updated record should be written is in an uncopied status, and writing the updated record in the copy source database and the copy destination database if the page in which the updated data should be written is in a copied status.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The invention will now be described in detail with reference to drawings showing a preferred embodiment thereof.

First, the outline of the invention applied to the preferred embodiment will be described, and then details of the preferred embodiment will be described.

Figure 1:
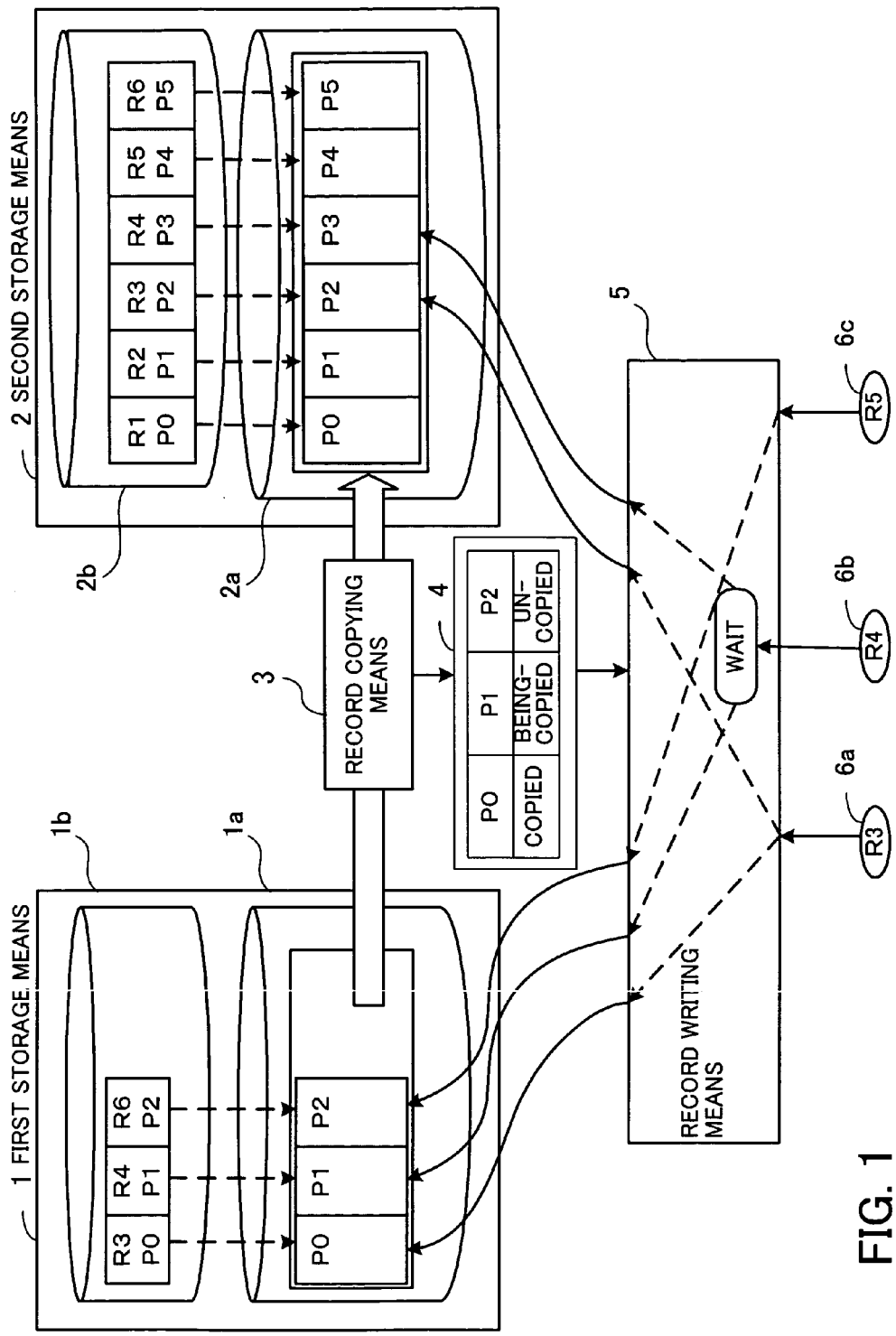
FIG. 1 a diagram showing the concept of the present invention applied to an embodiment thereof.

FIG. 1 is a diagram showing the concept of the invention applied to the preferred embodiment. In the illustrated example, it is assumed that a database 1a as a copy source (hereinafter referred to as "the copy source database 1a") provided in a first storage means 1 is rearranged to thereby generate a database 2a as a copy destination (hereinafter referred to as "the copy destination database 2a") in a second storage means. The storage area in the copy source database 1a is divided into a plurality of pages, and records which should be stored in each page are defined by an index 1b. Similarly, the storage area in the copy destination database 2a is divided into a plurality of pages, and records which should be stored in each page are defined by an index 2b. Further, when updating processing is carried out on the copy source database 1a and the copy destination database 2a, details of the updating processing are stored in respective logs.

In the example illustrated in FIG. 1, the indexes 1b and 2b define associations between record numbers (Rm: m is an integer equal to or larger than 0) and page numbers (Rn: n is an integer equal to or larger than 0). Each page stores records having respective record numbers which are equal to or smaller than a record number associated with the page number of the page by the indexes 1b and 2b, and at the same time larger than a record number associated with a page having a smaller page number by 1.

A record copying means 3 sequentially selects pages in the copy source database 1a in response to a request for rearranging the copy source database 1a. Then, the record copying means 3 copies the records in the selected page to the copy destination database 2a. Further, the record copying means 3 sets the status of progress of copying of each page of the copy source database 1a to a page status management table 4.

In the page status management table 4, the status of copying is set on a page-by-page basis, for all the pages of the copy source database 1a. This status is classified into the categories of an uncopied status (shown as "UNCOPIED"), a being-copied status (shown as "BEING-COPIED"), and a copied status (shown as "COPIED").

A record writing means 5 refers to the page status management table 4 in response to a request for writing updated records, and determines a page into which the updated records should be written according to the page status of the page. More specifically, if the page associated with the updated records in the copy source database 1a is in the uncopied status, the updated records are written into the associated page therein. On the other hand, if the page associated with the updated records in the copy source database 1a is in the copied status, the updated records are written into the associated pages in the copy source database 1a and the copy destination database 2a. Further, if the page associated with the updated records in the copy source database 1a is in the being-copied status, transition of the page status to the copied status is awaited and when the being-copied status is changed to the copied status, the updated records are written into the associated pages in the copy source database 1a and the copy destination database 2a.

According to the database-rearranging apparatus described, when a request for rearranging the copy source database 1a is input, the record copying means 3 sequentially selects pages in the copy source database 1a, and the records in the selected page are copied to the copy destination database 2a. Further, the record copying means 3 sets the status of progress of copying of each page of the copy source database 1a to the page status management table 4.

Now, let it be assumed that the page numbers ("P0", "P1", and "P2") are sequentially selected in ascending order. In FIG. 1, the page status management table shows a status in which a page having a page number "P1" is being copied. In the illustrated example, a page having a page number "P0" is in the copied status, the page having the page number "P1" is in the being-copied status, and a page having a page number "P2" is in the uncopied status.

When a request for writing an updated record is input during the database-rearranging process, the record writing means 5 refers to the page status management table 4, and determines the status of a page where the updated record should be written.

For example, assuming that a record having a record number "R3" is input as an updated record 6a, since the page in the copy source database 1a having the page number "P0" is associated with this record number, the updated record 6a should be written therein. In the example illustrated in FIG. 1, the page having the page number "P0" is in the copied status, so that the updated record 6a is written into the copy source database 1a and the copy destination database 2a.

Assuming that a record having a record number "R4" is input as an updated record 6b, since the page in the copy source database 1a having the page number "P1" is associated with this record number, the updated record 6b should be written therein. In the illustrated example, the page having the page number "P1" is in the being-copied status, so that after waiting for a status change of the associated page from the being-copied status to the copied status, the updated record 6b is written in the copy source database 1a and the copy destination database 2a.

Assuming that a record having a record number "R5" is input as an updated record 6c, since the page in the copy source database 1a having the page number "P2" is associated with this record number, the updated record 6c should be written therein. In the illustrated example, the page having the page number "P2" is in the uncopied status, so that the updated record 6c is written in the copy source database 1a.

Thus, the rearrangement of the database is carried out without stopping writing of records. Although write wait time occurs if the associated page is being copied, the copying of one page can be executed in a short time period, and therefore this causes no such influence as will cause the stoppage of the service of the database. What is more, when updating of a record is performed on a copied page, the updated record is written in the copy source database 1a as well, which makes it possible to restore the database e.g. even when job cancellation occurs.

Now, a description will be given of the details of the present embodiment.

Figure 2:
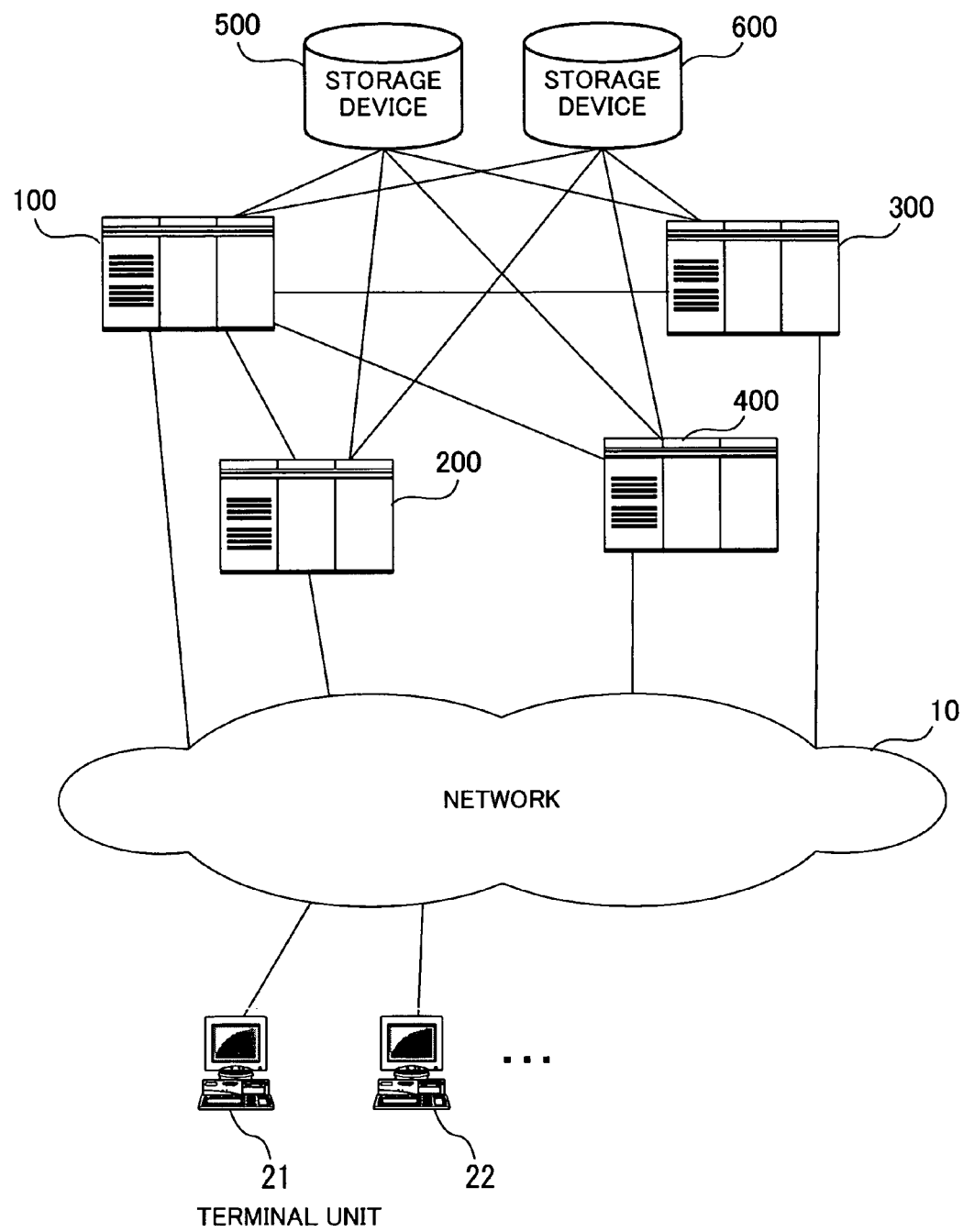
FIG. 2 is a diagram showing an example of a system configuration of the embodiment.

FIG. 2 is a diagram showing a system configuration of the present embodiment. In the present embodiment, a plurality of host computers 100, 200, 300, and 400, and a plurality of terminal units 21, 22, . . . are connected via a network 10. Storage devices 500 and 600 are connected to the host computers 100, 200, 300, and 400. Further, the host computer 100 is connected to the other host computers 200, 300, and 400 via high-speed communication lines. The host computers 200, 300, and 400 can access a shared memory of the host computer 100.

The host computers 100, 200, 300, and 400 execute transactions on databases respectively constructed in the storage devices 500 and 600, in response to requests from the terminal units 21, 22, . . . . Further, at least one host computer has a capability of rearranging the database. In the embodiment, it is assumed that the host computer 100 rearranges the database. The host computer 100 has the following hardware configuration so as to carry out the rearrangement of the database.

Figure 3:
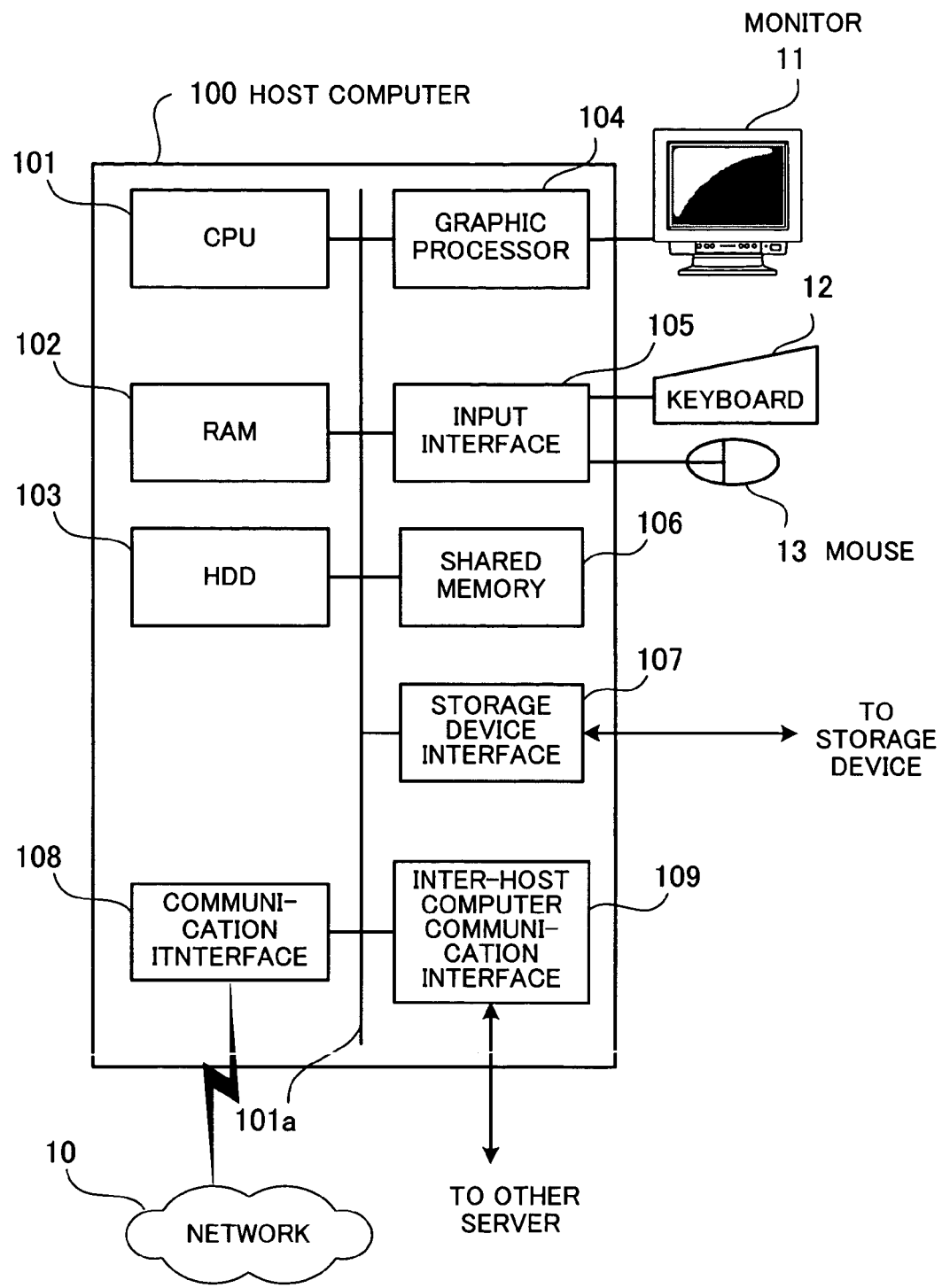
FIG. 3 is a diagram showing an example of a hardware configuration of a host computer that performs rearrangement of the database.

FIG. 3 is a diagram showing an example of the hardware configuration of the host computer that performs the rearranging of the database. The overall operation of the host computer 100 is controlled by a CPU (Central Processing Unit) 101. The CPU 101 is connected via a bus 101a to a RAM (Random Access Memory) 102, a hard disk drive (HDD) 103, a graphic processor 104, an input interface 105, a storage device interface 107, a communication interface 108, and an inter-host computer communication interface 109.

The RAM 102 temporarily stores at least part of an OS (Operating System) and application programs to be executed by the CPU 101. Further, the RAM 102 stores various data necessary for processing by the CPU 101. The HDD 103 stores the OS and the application programs.

The graphic processor 104 is connected to a monitor 11. The graphic processor 104 displays an image on the screen of the monitor 11 according to instructions from the CPU 101. The input interface 105 has a keyboard 12 and a mouse 13 connected thereto. The input interface 105 sends signals from the keyboard 12 and the mouse 13 to the CPU 101 via the bus 101a.

The shared memory 106 is a recording medium of which the use can be shared between the host computers 200, 300, and 400. The shared memory 106 is implemented e.g. by a semiconductor memory which is backed-up by a battery. During rearrangement of the database, the page status management table indicative of the respective statuses of pages of the database is stored in the shared memory 106.

The storage device interface 107 is connected to the storage devices 500 and 600. The storage device interface 107 performs input and output of data to and from the storage devices 500 and 600 in response to instructions from the CPU 101.

The communication interface 108 is connected to the network 10. The communication interface 108 sends and receives data to and from the terminal units 21, 22, . . . via the network 10.

The inter-host computer communication interface 109 is connected to the other host computers 200, 300, and 400. The inter-host computer communication interface 109 sends and receives data to and from the other host computers 200, 300, and 400. For example, the inter-host computer communication interface 109 sends information stored in the shared memory 106 to the other host computers 200, 300, and 400.

The hardware configuration described above can implement the processing functions of the present embodiment. Although the above description is given of the hardware configuration of the host computer 100 shown in FIG. 3, the other host computers 200, 300, and 400 can be also implemented by the same hardware configuration. However, the shared memory need not be installed on the host computers 200, 300, and 400.

Now, a description will be given of the database-rearranging process executed by the system configured as illustrated in FIGS. 2 and 3.

Figure 4:
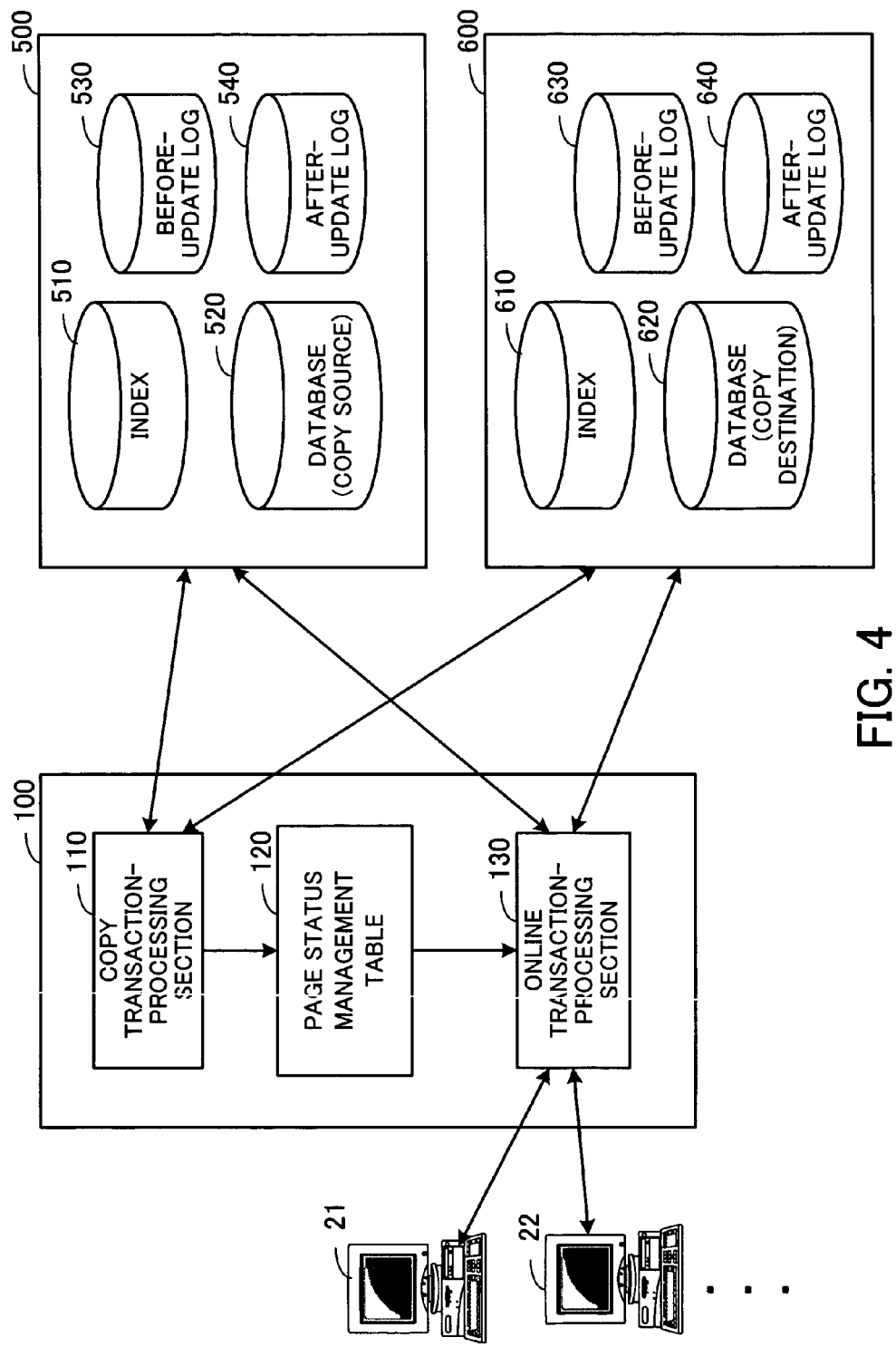
FIG. 4 is a functional block diagram illustrating functions realizing the embodiment.

FIG. 4 is a functional block diagram showing the functions for realizing the present embodiment. FIG. 4 shows an example of the case where the database constructed in the storage device 500 is rearranged in the storage device 600.

The storage device 500 stores an index 510, a copy source database 520, a before-update log 530, and an after-update log 540. Before executing the rearrangement of the database, the services are provided to the terminal units 21, 22, . . . , using the elements stored in the storage device 500.

The index 510 defines identification numbers (record numbers) of records stored in pages of the database 520. The database 520 has a storage area divided into a plurality of pages. Each page stores records associated therewith by the index 510. In the before-update log 530, there are recorded contents of records as stored in the database 520 before execution of updating thereof in the case where updating thereof is executed. In the after-update log 540, there are recorded contents of records as stored in the database 520 after execution of the updating thereof in the case where the updating thereof is executed.

The storage device 600 stores an index 610, a copy destination database 620, a before-update log 630, and an after-update log 640. The elements stored in the storage device 600 are generated when the database-rearranging process is started.

The index 610 defines identification numbers (record numbers) of records stored in pages of the database 620. The database 620 has a storage area divided into a plurality of pages. Each page stores records associated therewith by the index 610. In a before-update log 630, there are recorded contents of records as stored in the database 620 before execution of updating thereof in the case where updating thereof is executed. In an after-update log 640, there are recorded contents of records as stored in the database 620 after execution of updating thereof in the case where the updating thereof is executed.

The host computer 100 includes a copy transaction-processing section 110, a page status management table 120, and an online transaction-processing section 130.

The copy transaction-processing section 110 carries out the database-rearranging process. More specifically, in response to a request for rearranging the database 520, the copy transaction-processing section 110 generates the index 610, the copy destination database 620, the before-update log 630, and the after-update log 630, mentioned above, in the storage device 600. At this time, information stored in the index 610 is configured such that the storage capacity of the copy destination database 620 becomes larger than that of the database 520. Then, the copy transaction-processing section 110 copies records in the database 520 to the database 620, on a page-by-page basis. In doing this, the status of each page is set in the page status management table 120.

The page status management table 120 records the status of each page in the database 520 of the copy source destination during rearrangement of the database. The status of the page is classified into "uncopied", "being-copied", and "copied".

The online transaction-processing section 130 executes transactions for operations of the database in response to requests from the terminal devices 21, 22, . . . . During the process for rearranging the database, the online transaction-processing section 130 refers to the page status management table 120 to determine which of the databases should be accessed.

Next, a detailed description will be given of the relationship between the index 510 and the database 520.

Figure 5:
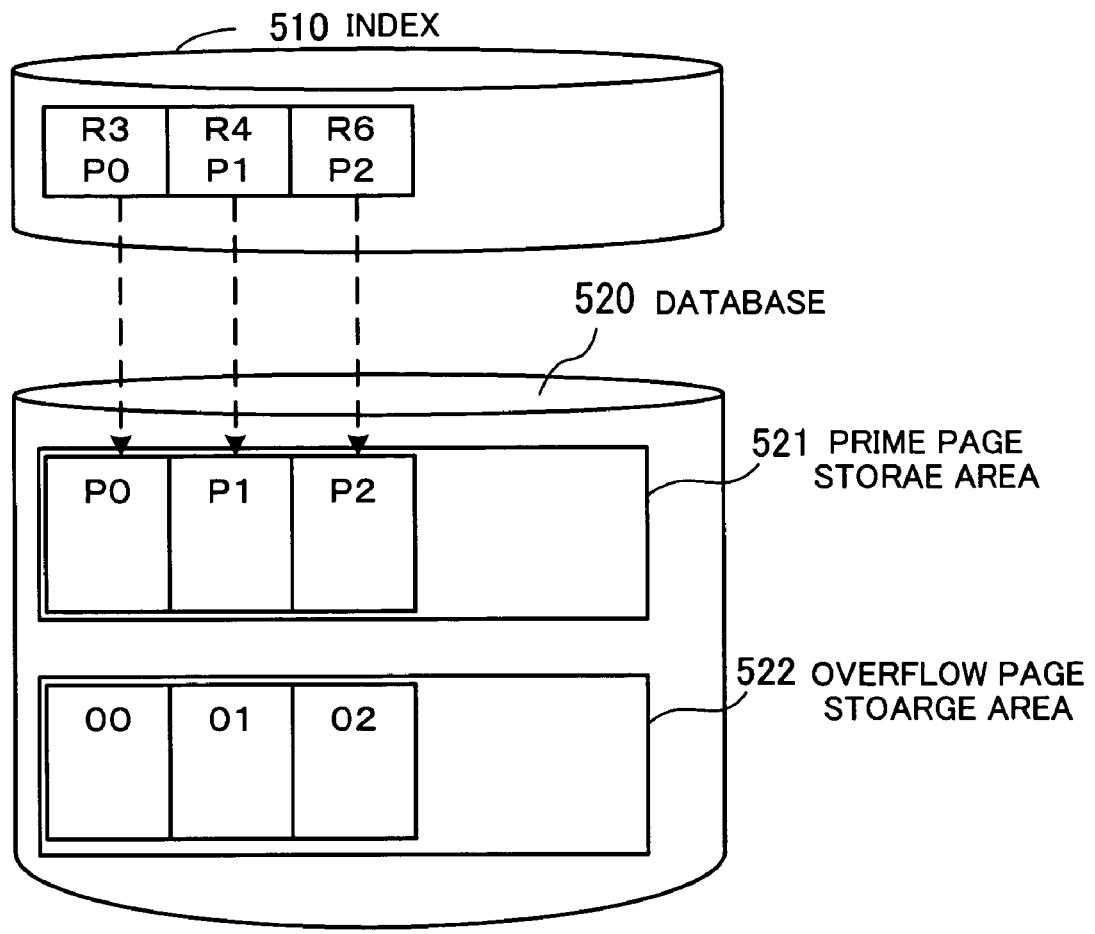
FIG. 5 is a diagram showing an example of the data structures of an index and a database associated therewith.

FIG. 5 is a diagram showing the data structures of the index and the database. The index 510 defines the record numbers of records stored in each page in association with the page number of the page (a page number is represented by Pm, and a record number by Rn).

For efficient transaction processing, a record having a smaller record number is assigned to a page having a smaller page number. Therefore, in the index 510, the largest record number of records stored in each page is set in association with the page number of the page.

In the example shown in FIG. 5, in association with the page number "P0", the record number "R3" is set. This means that for a page having the page number "P0", records having respective record numbers "R0$x$" to "R3$x$" ($x$ is an integer equal to or larger than 0) are registered.

Further, in association with the page number "P1", the record number "R4" is set. This means that for a page having the page number "P1", records having respective record numbers "R4$x$" are registered.

In association with the page number "P2", the record number "R6" is set. This means that for a page having the page number "P2", records having respective record numbers "R5$x$" and "R6$x$" are registered.

It should be noted that when the database 520 is used as a network database (NDB), each record contains a plurality of data correlated with each other in the form of a tree structure. In this case, the correlation between the data in the database 520 is reproduced in the copy destination database 620.

The database 520 is provided with a prime pages storage area 521 for storing a plurality of prime pages, and an overflow pages storage area 522 for storing a plurality of overflow pages. The prime pages are storage areas corresponding to the respective page numbers set in the index 510. Only records having record numbers defined by the index 510 can be stored in each prime page.

The overflow pages are storage areas for storing records which cannot be stored in the respective prime pages corresponding to the record numbers. When a record is stored in an overflow page, a pointer pointing to the overflow page is set in a prime page the page number of which is associated with the record number of the record. By referring to the pointer, it is possible to identify the overflow page storing the record.

As described above, for each prime page, record numbers of records which can be stored therein are already specified. When there are records that cannot be stored in one prime page, they are stored in an overflow page.

However, when the amount of records which are stored in overflow pages increases, the efficiency of access to the database 520 is degraded. More specifically, in accessing a desired record, the online transaction-processing section 130 first refers to the index 510, and then determines a prime page where the record is stored. Then, the online transaction-processing section 130 searches the corresponding prime page for the record to be accessed.

If the record to be accessed cannot be found here, the online transaction-processing section 130 refers to the pointer registered in the prime page to determine an overflow page associated therewith, and then searches the overflow page for the record to be accessed.

As described above, in accessing a page stored in the overflow pages, the online transaction-processing section 130 carries out a search process in two stages. Therefore, the efficiency of processing access thereto is degraded.

To eliminate this inconvenience caused by an increase in the amount of records stored in the overflow pages, the rearrangement of the database is carried out so as to increase the capacity of the prime pages. In rearranging the database, the records in the database 520 are copied to the database 620, on a page-by-page basis. In doing this, the status of each prime page in the database 520 is managed by the page status management table 120.

Figure 6:
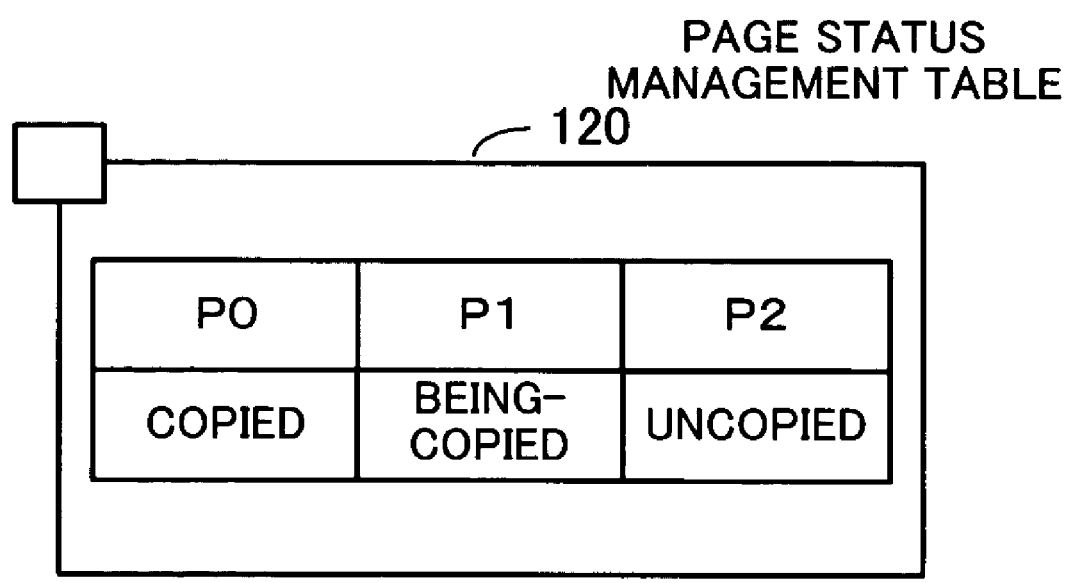
FIG. 6 is a diagram showing an example of the data structure of a page status management table.

FIG. 6 is a diagram showing an example of the data structure of the page status management table. In the page status management table 120, the status of each page in the database 520 is set in association with the page number of the page. The status is classified into the uncopied status (shown as "UNCOPIED"), the being-copied status (shown as "BEING-COPIED"), and the copied status (shown as "COPIED"). The uncopied status is a status in which copying of records from the database 520 to the database 620 is not executed yet. The being-copied status is a status in which copying of records from the database 520 to the database 620 is being executed. The copied status is a status in which the copying of records from the database 520 to the database 620 is completed.

It should be noted in the present embodiment, it is possible to carry out the database-rearranging process while continuously executing an online transaction. Hereafter, a detailed description will be given of the database-rearranging process and an online transaction executed during the database-rearranging process.

Figure 7:
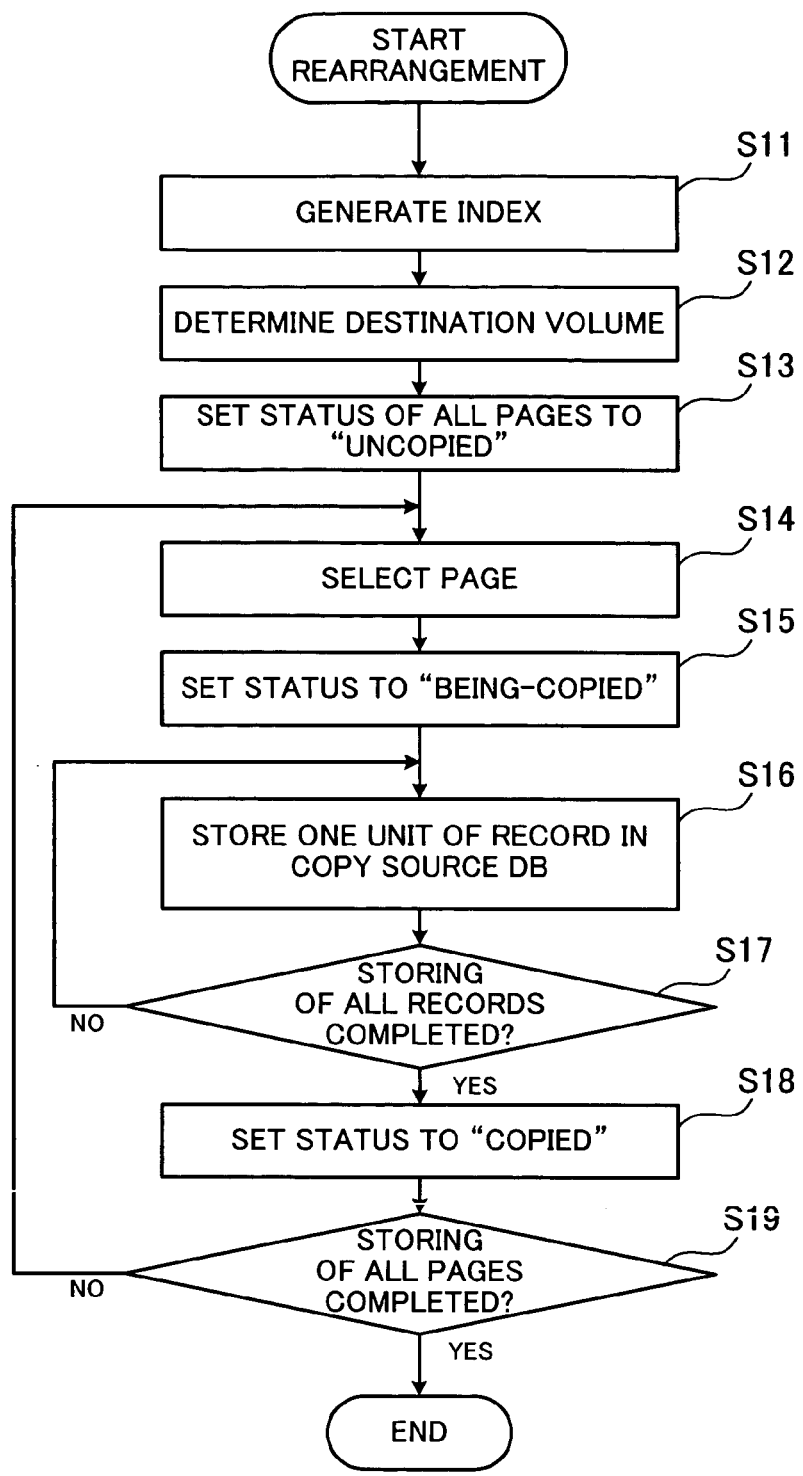
FIG. 7 is a flowchart showing a database-rearranging process.

FIG. 7 is a flowchart showing the database-rearranging process. Hereafter, a description will be given of the process shown in FIG. 7, following the order of step numbers.

[Step S11] The copy transaction-processing section 110 generates the index 610 in the storage device 600. In the index 610, the number of prime pages is increased. More specifically, the index 610 defines a larger number of prime pages for the prime pages storage area 621 than the number of prime pages in the database 520. By increasing the number of prime pages, the capacity of the database is increased.

[Step S12] The copy transaction-processing section 110 determines a destination volume to which data of the database should be copied. In the present embodiment, the storage device 600 is determined to be the destination volume.

[Step S13] The copy transaction-processing section 110 sets all the page statuses in the page status management table 120 to "uncopied".

[Step S14] The copy transaction-processing section 110 selects an uncopied page having a smallest page number from the prime pages in the database 520.

[Step S15] The copy transaction-processing section 110 changes the status of the prime page selected in the step S14 in the page status management table 120 to "being-copied".

[Step S16] The copy transaction-processing section 110 copies the records in the prime page in the copy source database 520, which is selected in the step S14, to the database 620 in the storage device 600. In doing this, the prime page as the copy destination is formed such that it conforms to the index 610 generated in the step S11. Further, the copy transaction-processing section 110 also copies records stored in an overflow page which is pointed to by the pointer in the prime page selected in the step S14 to the database 620 in the same manner.

[Step S17] The copy transaction-processing section 110 determines whether or not all the records stored in the prime page selected in the step S14 and the overflow page associated with the prime page by the pointer have been copied. If the copying of all the records in these pages is completed, the process proceeds to a step S18, whereas if there remains any record yet to be copied, the process proceeds to the step S16, wherein the record is copied.

[Step S18] The copy transaction-processing section 110 changes the status of the prime page selected in the step S14 in the page status management table 120 to "copied".

[Step S19] The copy transaction-processing section 110 determines whether or not copying of all the pages in the database 520 is completed. If the copying of all the pages is completed, the present process is terminated, whereas if there is any page yet to be copied, the process proceeds to the step S14, wherein the page is copied.

As described above, the copy transaction-processing section 110 carries out copying of pages, on a page-by-page basis, and the status of each of pages to be copied which is set in the page status management table 120 is updated as appropriate. This makes it possible for the online transaction-processing section 130 to recognize the status of each prime page by referring to the page status management table 120. Through recognition of the status of each prime page by the online transaction-processing section 130, transactions for updating records in the database can be carried out even during the rearrangement of the database.

Figure 8:
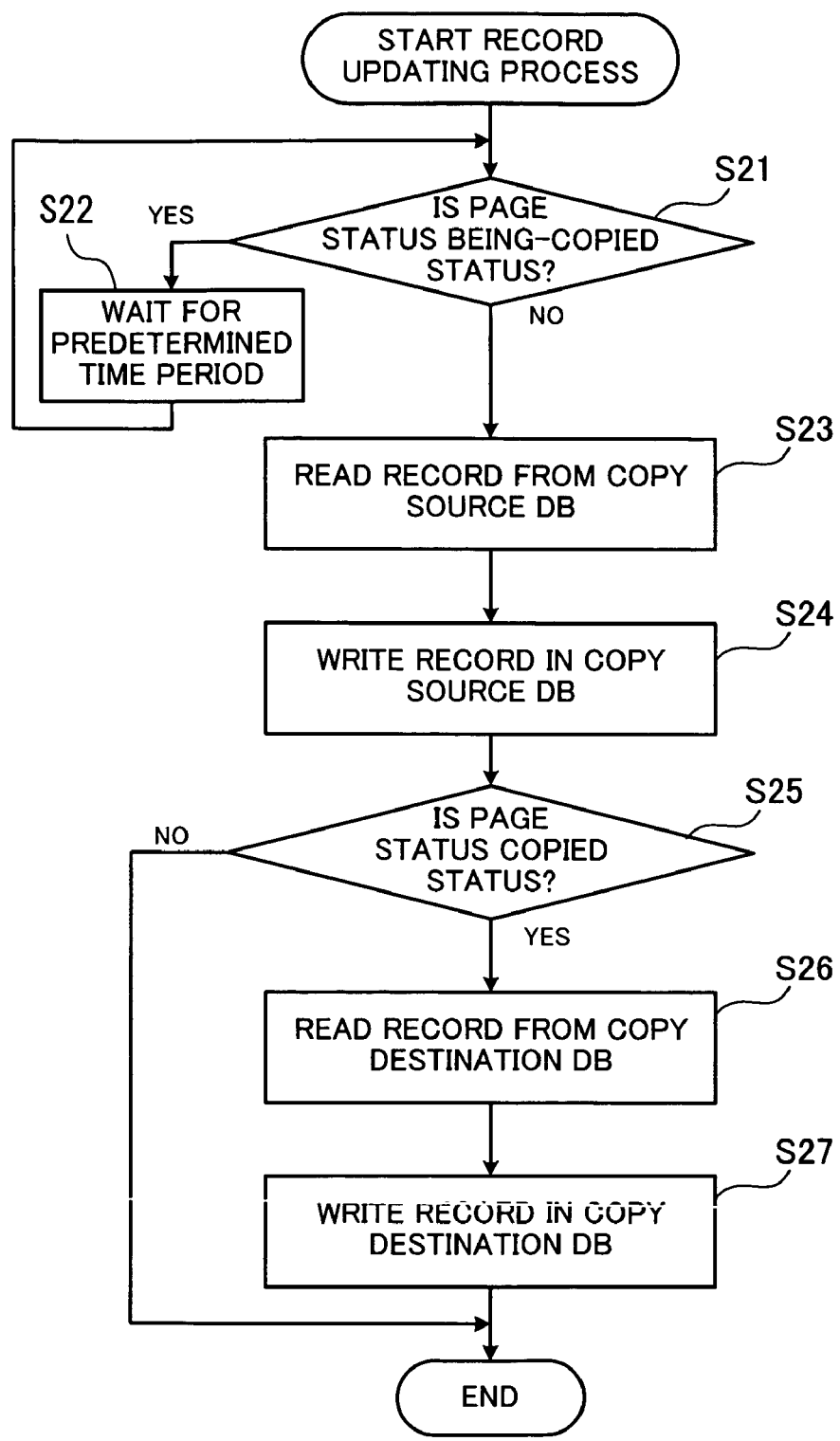
FIG. 8 is a flowchart showing a record-updating process during the database-rearranging process.

FIG. 8 is a flowchart showing a record-updating process executed during rearrangement of the database. Hereinafter, a description will be given of the record-updating process with reference to FIG. 8, following the order of step numbers.

[Step S21] The online transaction-processing section 130 refers to the index 510, to thereby determine a prime page storing a record to be processed. Then, the online transaction-processing section 130 refers to the page status management table 120 to thereby determine whether the prime page is in the being-copied status. If the prime page is in the being-copied status, the process proceeds to a step S22, whereas if not, the process proceeds to a step S23.

[Step S22] If the prime page to be accessed is being copied, the online transaction-processing section 130 awaits the lapse of a predetermined time period and then proceeds to the step S21 to determine the status of the prime page again.

[Step S23] If the prime page to be accessed is not being copied, the online transaction-processing section 130 reads the record to be updated from the copy source database 520.

[Step S24] The online transaction-processing section 130 updates the contents of the record read in the step S23 and writes the updated record in the database 520.

[Step S25] The online transaction-processing section 130 refers to the page status management table 120 to thereby determine whether the prime page to be updated is in the copied status. If the prime page is in the copied status, the process proceeds to a step S26, whereas if not, the present process is terminated.

[Step S26] The online transaction-processing section 130 reads the record to be updated from the copy destination database 620.

[Step S27] The online transaction-processing section 130 updates the contents of the record read in the step S26 and writes the updated record in the database 620, followed by terminating the present process.

As described above, depending on the status of a prime page to be updated, which of the databases should be accessed is determined, whereby it is possible to carry out the online transaction during execution of the database rearrangement.

Figure 9:
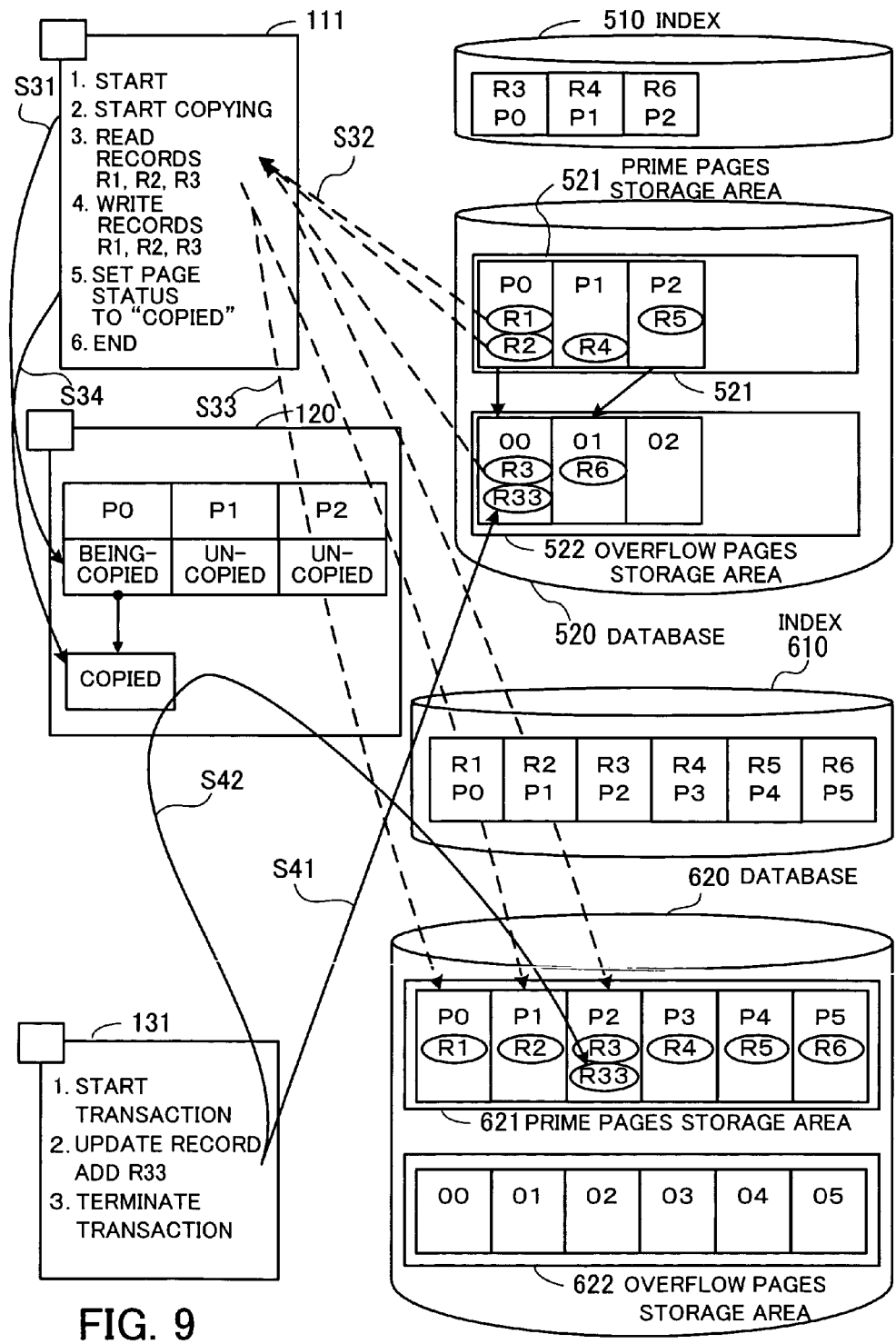
FIG. 9 is a conceptual diagram showing a process carried out when the database-updating process and an online transaction are simultaneously carried out.
Figure 10:
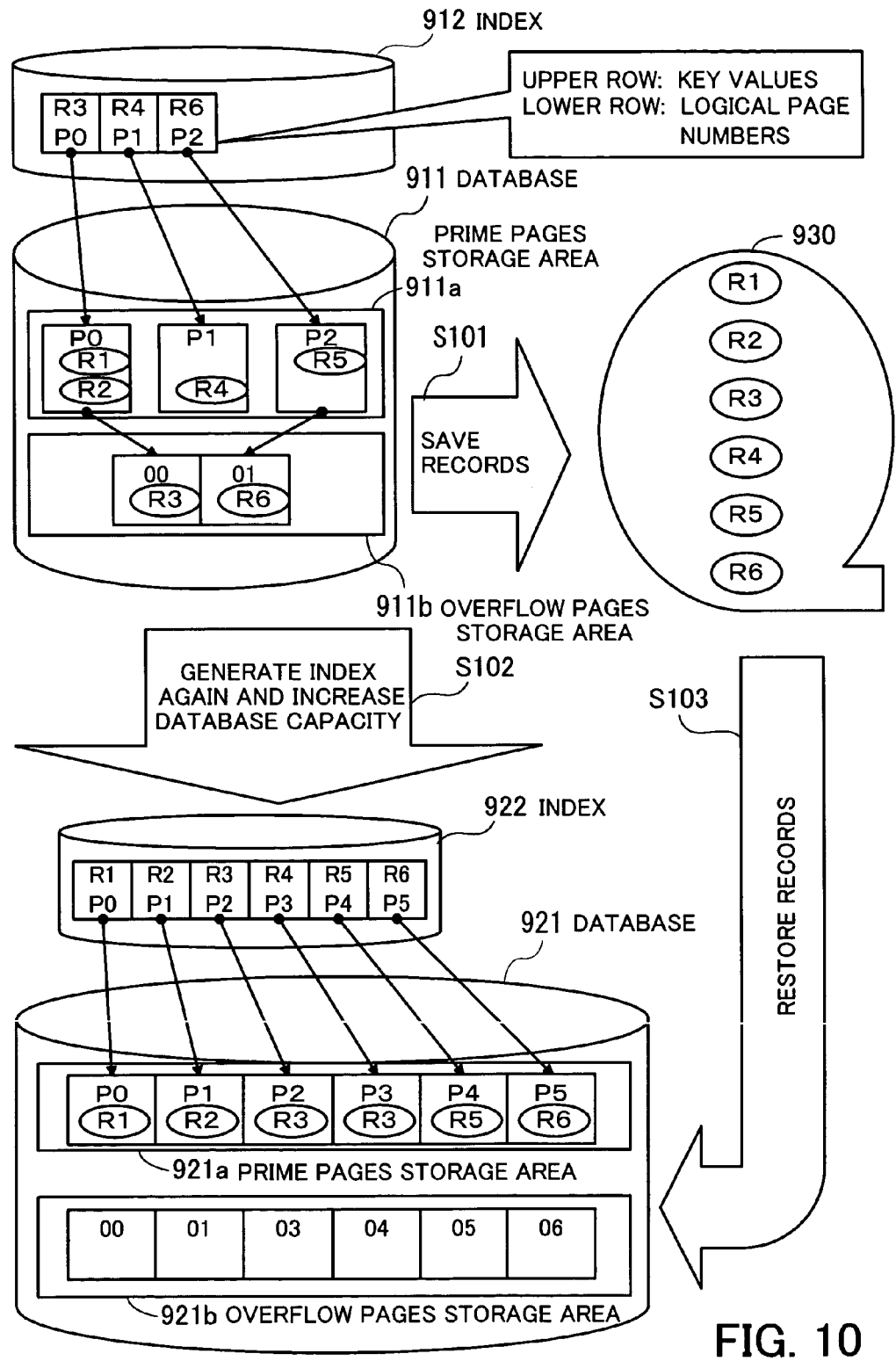
FIG. 10 is a diagram illustrating a conventional general database-rearranging method.
Figure 11:
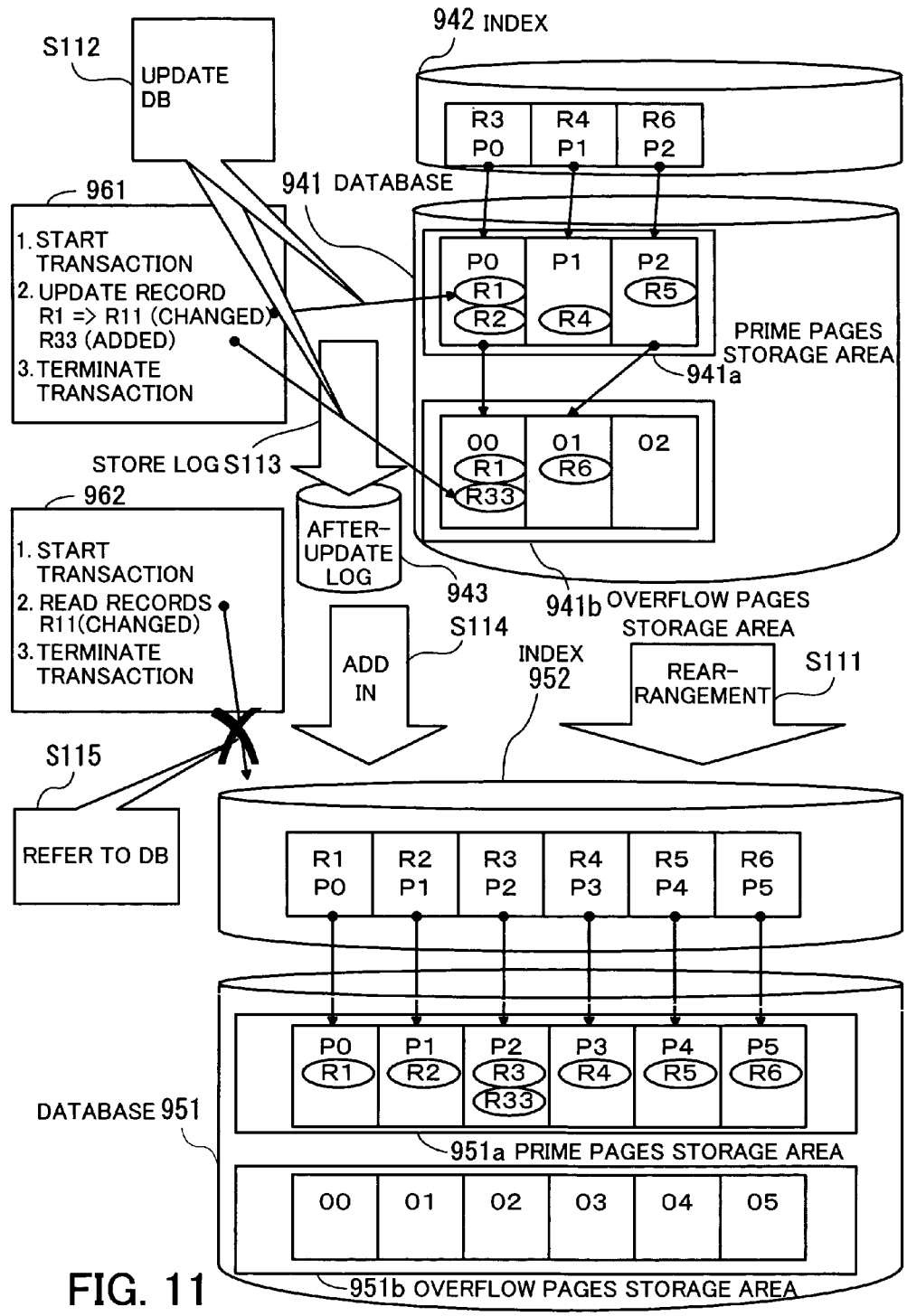
FIG. 11 is a diagram illustrating a conventional method of carrying out rearrangement of a database without stopping access to the database.

FIG. 9 is a conceptual diagram showing a process in which the database-rearranging process and an online transaction are simultaneously carried out. When a request for rearranging the database 520 is issued by an input operation of an system administrator, the index 610 and the database 620 are generated in the storage device 600. The database 620 contains the prime pages storage area 621 for storing a plurality of prime pages and the overflow storage area 622 for storing a plurality of overflow pages.

Thereafter, the copy transaction-processing section 110 starts copying of records from the copy source database 520 to the copy destination database 620. The copying of records is executed by a copy transaction 111 generated for each of the prime pages.

When the copy transaction 111 is started, the status of a prime page to be copied (prime pages are each sequentially become an object to be copied in ascending order of page numbers), which is set in the page status management table 120, is changed to the "being-copied" status, and then the copying is started (step S31). In the illustrated example in FIG. 9, the status of the prime page having the page number "P0" is changed to the being-copied status shown as "BEING-COPIED").

Next, in the copy transaction 111, records are sequentially read from the prime page to be copied and an overflow page associated therewith by a pointer in the prime page (step S32). In the illustrated example, records having the record numbers "R1" and "R2" are read out from the prime page and a record having the record number "R3" is read from the overflow page.

Next, the contents of the read records are written in the copy destination database 620 according to the index 610 (step S33). In the illustrated example in FIG. 9, the index 610 of the copy destination database 620 associates records having the record numbers "R1", "R2", and "R3" with pages having the page numbers "P0", "P1", and "P2", respectively. Therefore, the record having the record number "R1" is written in the prime page having the page number "P0", the record having the record number "R2" in the prime page having the page number "P1", and the record having the recording number "R3" in the prime page having the page number "P2".

When all the records in the prime page having the page number "P0" in the copy source database 520 are stored in the copy destination database 620, the status of the page in the page status management table 120 is changed from the being-copied status to the copied status (shown as "COPIED"). This completes the copy transaction of one prime page.

The copy transaction-processing section 110 repeatedly carries out the copy transaction on the other prime pages ("P1" and "P2") in the same manner. Thus copying of records is executed from the first page to the last page of the copy source database 520.

At this time, if the online transaction-processing section 130 receives a request for updating records, from the terminal unit 21, an online transaction 131 is started. The online transaction 131 adds records to the copy source database 520 (step S41). Further, reference is made to the page status management table 120, and if the status of the prime page in which records should be written is in the copied status, the records are added to the copy destination database 620 (step S42). It should be noted that in adding records to the database 620, the page number of a page to which records should be added is determined based on the index 610 of the copy destination database 620.

If the page is in the being-copied status, the online transaction 131 is caused to wait, and when the copying is completed to change the page status to the copied status, the records are added to the copy destination database 620.

When the page is in the uncopied status, the storage of records in the copy destination database 620 is not executed. That is, the records are stored in the copy source database 520 alone. In this case, the copy transaction 111 copies the contents of the page from the copy source database 520 to the copy destination database 620, whereby logical equivalence between the original and copied pages is guaranteed.

As described above, since the rearrangement is carried out on a page-by-page basis i.e. in minimum units, it is possible to rearrange the database without stopping the online service. What is more, when updating of records is carried out on copied pages, the records are written in both of the copy source database 520 and the copy destination database 620. At this time, the online transaction-processing section 130 records contents of the written records in the after-update log 540. By recording the records in the after-update log 540, it is possible to easily restore the contents of the database 520 even when the contents of the database 520 are made incomplete e.g. due to abnormal termination of the host computer 100.

Further, in the present embodiment, when the records are updated, writing of the records in the copy source database 520 used online and the copy destination database 620 in which the copy source database 520 should be rearranged online is processed by the same transaction. This makes it possible to guarantee the original data even when job cancellation occurs.

It should be noted that the processing functions described above can be realized by a computer. To this end, there is provided a program describing the details of processing of the functions which the host computer should have. By executing the program on the computer, the processing functions described above are realized on the computer. The program describing the details of processing can be recorded in a computer-readable recording medium. The computer-readable recording medium includes a magnetic recording device, an optical disk, a magneto-optical recording medium, and a semiconductor memory. The magnetic recording device includes a hard disk drive (HDD), a flexible disk (FD), and a magnetic tape. The optical disk includes a DVD (Digital Versatile Disk), a DVD-RAM (Random Access Memory), and a CD-ROM (Compact Disk Read Only Memory), and a CD-R (Recordable)/RW (ReWritable). Further, the magneto-optical recording medium includes an MO (Magneto-Optical disk).

To make the program available on the market, portable recording media, such as DVD and CD-ROM, which store the program, are sold. Further, the program can be stored in a storage device of a server computer connected to a network, and transferred from the server computer to another computer via the network.

When the program is executed by a computer, the program stored e.g. in a portable recording medium or transferred from the server computer is stored into a storage device of the computer. Then, the computer reads the program from the storage device of its own and executes processing based on the program. The computer can also read the program directly from the portable recording medium and execute processing based on the program. Further, the computer may also execute processing based on a program which is transferred from the server computer whenever the processing is to be carried out.

As described above, according to the present invention, copying data in the database is carried out on a page-by-page basis, and when a page into which an updated record should be written is in the uncopied status, the updated record is written in the page in the copy source database, and when the same is in the copied status, the updated record is written in the copy source database and the copy destination database. Therefore, it is possible to carry out the rearrangement of the database without stopping the operations involving access to the database, and easily restore the database based on the copy source database in case a system failure occurs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable, non-transitory medium storing a database-rearranging program for rearranging a database, the database-rearranging program causing a computer to execute a procedure comprising:

sequentially selecting pages of a first database in response to a request for rearranging data stored in the first database, and copying records in the sequentially selected pages to a second database, while recording a progress status of the copying in a page status management table such that each page in the first database is given an uncopied status indicating that the page has not yet been subjected to the copying, or a being-copied status indicating that the page is in process of the copying, or a copied status indicating that the copying of the page has been completed; and referring to the page status management table, in response to a request for writing an updated record in a specified page of the first database, to retrieve the progress status of the specified page, writing the updated record in the specified page of the first database when the retrieved progress status indicates that the specified page is in the uncopied status, writing the updated record in the specified page of both the first and second databases when the retrieved progress status indicates that the specified page is in the copied status, waiting for a change in the progress status when the retrieved progress status indicates that the specified page is in the being-copied status, and writing the updated record in the specified page of both the first and second databases when the progress status of the specified page is changed from the being-copied status to the copied status.

2. The computer-readable, non-transitory medium according to claim 1, wherein:

the first database includes a plurality of prime pages for which numbers of records to be stored therein are defined in advance, and a plurality of overflow pages for storing records which cannot be stored in the prime pages associated therewith, the selecting sequentially selects the prime pages, and the copying copies one of the prime pages that is selected, as well as the overflow page storing records which cannot be stored in the selected prime page.

3. The computer readable, non-transitory medium according to claim 2, wherein the copying of the selected prime page and the copying of the overflow page storing records which cannot be stored in the selected prime page are executed in a single transaction.

4. The computer readable, non-transitory medium according to claim 2, wherein upon selection of the prime page, the progress status of the selected prime page is changed to the being-copied status, and when the copying of the selected prime page and the copying of the overflow page storing records which cannot be stored in the selected prime page are both completed, the progress status of the selected prime page is changed to the copied status.

5. The computer readable, non-transitory medium according to claim 1, wherein all the pages of the first database is initially given the uncopied status in the page status management table, and the progress status of a page is changed to the being-copied status when the copying of the page is started and then to the copied status when the copying of the page is completed.

6. A computer implemented method of rearranging a database, the computer implemented method comprising:
sequentially selecting pages of a first database in response to a request for rearranging data stored in the first database, and copying records in the sequentially selected pages to a second database, while recording a progress status of the copying in a page status management table such that each page in the first database is given an uncopied status indicating that the sage has not yet been subjected to the copying, or a being-copied status indicating that the page is in process of the copying, or a copied status indicating that the copying of the page has been completed; and
referring to the page status management table, in response to a request for writing an updated record in a specified page of the first database, to retrieve the progress status of the specified page, writing the updated record in the specified page of the first database when the retrieved progress status indicates that the specified page is in the uncopied status, writing the updated record in the specified page of both the first and second databases when the retrieved progress status indicates that the specified page is in the copied status, waiting for a change in the progress status when the retrieved progress status indicates that the specified page is in the being-copied status and writing the updated record in the specified page of both the first and second databases when the progress status of the specified page is changed from the being-copied status to the copied status.

7. A database-rearranging apparatus for rearranging a database, the database-rearranging apparatus comprising:
record copying means performed by a processor, responsive to a request for rearranging data stored in a first database, for sequentially selecting pages of the first database, and copying records in the sequentially selected pages to a second database, while recording a progress status of the copying in a page status management table in a memory, such that each page in the first database is given an uncopied status indicating that the page has not yet been subjected to the copying, or a being-copied status indicating that the page is in process of the copying, or a copied status indicating that the copying of the page has been completed; and
record writing means performed by the processor, responsive to a request for writing an updated record in a specified page of the first database, for referring to the page status management table to retrieve the progress status of the specified page, and writing the updated record in the specified page of the first database when the retrieved progress status indicates that the specified page is in the uncopied status, writing the updated record in the specified page of both the first and second databases when the retrieved progress status indicates that the specified page is in the copied status, waiting for a change in the progress status when the retrieved progress status indicates that the specified page is in the being-copied status, and writing the updated record in the specified page of both the first and second databases when the progress status of the specified page is changed from the being-copied status to the copied status.

* * * * *